US006327661B1

(12) United States Patent
Kocher et al.

(10) Patent No.: US 6,327,661 B1
(45) Date of Patent: Dec. 4, 2001

(54) USING UNPREDICTABLE INFORMATION TO MINIMIZE LEAKAGE FROM SMARTCARDS AND OTHER CRYPTOSYSTEMS

(75) Inventors: Paul C. Kocher; Joshua M. Jaffe, both of San Francisco; Benjamin C. Jun, Palo Alto, all of CA (US)

(73) Assignee: Cryptography Research, Inc., San Francisco, CA (US)

( * ) Notice: Subject to any disclaimer, the term of this patent is extended or adjusted under 35 U.S.C. 154(b) by 0 days.

(21) Appl. No.: 09/326,222

(22) Filed: Jun. 3, 1999

Related U.S. Application Data (60) Provisional application No. 60/087,880, filed on Jun. 3, 1998.

(51) Int. Cl.[7] .............................. G06F 12/14; G06F 11/30
(52) U.S. Cl. ......................... 713/193; 713/322; 713/323; 713/501; 380/28; 380/46; 380/47
(58) Field of Search ................................. 713/172, 174, 713/193, 194, 300, 320, 322, 323, 324, 340, 500, 501, 502, 600, 601; 380/1, 28, 29, 42, 43, 46, 47, 48, 262, 263, 268

(56) References Cited

U.S. PATENT DOCUMENTS

| 4,200,770 | 4/1980 | Hellman et al. .................... 178/22 |
| 4,405,829 | 9/1983 | Rivest et al. ....................... 178/22.1 |
| 4,759,063 | 7/1988 | Chaum .................................. 380/30 |
| 4,905,176 | 2/1990 | Schultz ................................. 364/717 |
| 4,908,038 | 3/1990 | Matsumura et al. ..................... 902/5 |

(List continued on next page.)

OTHER PUBLICATIONS

Kocher, P. "Timing Attacks on Implementations of Diffie–Hellman, RSA, DSS and Other Systems." in: Koblitz, N., *Advances in Cryptology–CRYPTO '96* (Berlin, Springer, 1996), pp. 104–113.

Bellare, M. et al., "Incremental Cryptography: The Case of Hashing and Signing" in: Desmedt, Y., *Advances in Cryptology—CRYPTO '94*.

(List continued on next page.)

*Primary Examiner*—Gail Hayes
*Assistant Examiner*—Justin T. Durrow
(74) *Attorney, Agent, or Firm*—Joseph Yang; Thomas R. Lane; Skadden, Arps, et al.

(57) ABSTRACT

Methods and apparatuses are disclosed for securing cryptosystems against external monitoring attacks by reducing the amount (and signal to noise ratio) of useful information leaked during processing. This is generally accomplished by incorporating unpredictable information into the cryptographic processing. Various embodiments of the invention use techniques such as reduction of signal to noise ratios, random noise generation, clock skipping, and introducing entropy into the order of processing operations or the execution path. The techniques may be implemented in hardware or software, may use a combination of digital and analog techniques, and may be deployed in a variety of cryptographic devices.

36 Claims, 2 Drawing Sheets

U.S. PATENT DOCUMENTS

| | | | |
|---|---|---|---|
| 5,401,950 | 3/1995 | Yoshida | 235/487 |
| 5,404,402 | 4/1995 | Sprunk | 380/4 |
| 5,539,827 | 7/1996 | Liu | 380/37 |
| 5,664,017 * | 9/1997 | Gressel et al. | 380/30 |
| 6,041,122 * | 3/2000 | Graunke et al. | 380/21 |

OTHER PUBLICATIONS

"Security Requirements for Cryptographic Modules," Federal Information Processing Standards Publication (FIPS PUB) 140–1, U.S. Department of Commerce, National Institute of Standards and Technology, Jan. 1994.

RSA Data Security, RSAREF Cryptographic Toolkit Source Code, File R–RANDOM.C, available fronftp://ftp.rsa.com.

Krawczyk, H. et al., "HMAC: Keyed–Hashing for Message Authentication," Network Working Group Request for Comments RFC 2104, Feb. 1997.

Ryan, J. "Blinds for Thermodynamic Cipher Attacks," unpublished material on the world wide web at http://www.cybertrace.com/thrmatak.html Mar. 1996.

Menezes, A.J., et al., *Handbook of Applied Cryptography* (CRC Press, 1996), pp. including 285–298, 312–319, 452–462, 475, 515–524.

"Data Encryption Standard," Federal Information Processing Standards Publication (FIPS PUB) 46–2, U.S. Department of Commerce, National Institute of Standards and Technology, Dec. 30, 1993.

Biham, E. et al., "Differential Fault Analysis of Secret Key Cryptosystems" in: Kaliski, B., *Advances in Cryptology—CRYPTO 97*, (Berlin, Springer, 1997) $17^{th}$ Annual International Cryptology Conference, Aug. 17–21, 1997, pp. 513–525.

* cited by examiner

USING UNPREDICTABLE INFORMATION TO MINIMIZE LEAKAGE FROM SMARTCARDS AND OTHER CRYPTOSYSTEMS

This application claims the benefit of U.S. provisional patent application No. 60/087,880, filed on Jun. 3, 1998.

This application is related to co-pending U.S. patent application Ser. No. 09/224,682, filed on Dec. 31, 1998.

FIELD OF THE INVENTION

The present invention relates generally to securing cryptographic systems against external attacks and, more specifically, to the minimization and masking of useful information available by external monitoring of cryptographic operations.

BACKGROUND OF THE INVENTION

As described in U.S. Pat. 4,908,038 to Matsumura et al., cryptographic devices can be attacked using information gathered by observing the timing of comparison operations performed by such devices during their operation. For example, if a MAC (Message Authentication Code) algorithm is strong and the key is secure, forging a MAC should require $O(2^n)$ attempts (where n is the MAC length in bits), but a device using a vulnerable MAC validation process is vulnerable to an $O(n)$ timing attack.

If timing is the only source of leaked information, securing the device is often relatively straightforward. Previously known countermeasures to attacks involving information leaking from cryptosystems employ large and often expensive physical shielding and/or careful filtering of inputs and outputs (e.g., U.S. government Tempest specifications). Unfortunately, these techniques are difficult to apply in constrained engineering environments. For example, physical constraints (such as size and weight), cost, and the need to conserve power can often prevent the use of such techniques. It is also known to use certain computational techniques (e.g., see Matsumura, above, or P. Kocher, "Timing Attacks on Implementations of Diffie-Hellman, RSA, DSS, and Other Systems," *Advances in Cryptology—CRYPTO '96*, Springer-Verlag, 1996, pages 104–113) to equalize timing. However, sources of information leakage other than timing (e.g., a device's power consumption) provide other avenues of attack. Indeed, Matsumara's timing equalization system itself can be vulnerable to non-timing attacks, for example by analyzing power consumption to detect the start of processing delays. It would therefore be advantageous to protect the devices' internal operations themselves instead of (or in addition to) simply externally masking the devices' timing (or other) fluctuations.

The present invention includes countermeasures that can be incorporated into software and/or hardware, to provide improved protection at relatively low cost. Thus, the invention could be used in place of (or in addition to) traditional countermeasures. For example, the present invention can be implemented in smartcards and other highly constrained environments where physical shielding and other protection measures cannot be readily applied.

SUMMARY OF THE INVENTION

The use of unpredictable information to minimize leakage from smartcards and other cryptosystems is disclosed.

According to one approach, the present invention provides techniques for modifying the computational processes in implementations of cryptographic algorithms to incorporate new random information, beyond the input parameters that are traditionally used, while still producing desired results. Definitions and standards for cryptographic algorithms require that implementations of such algorithms produce specific outputs from given inputs. For example, implementations of the Data Encryption Standard (DES) defined in National Bureau of Standards Federal Information Processing Standard Publication 46 (Jan. 1977) should encrypt the message 0011223344556677 with the key 0123456789ABCDEF (with standard odd DES key parity bits) to produce the ciphertext CADB6782EE2B4823. However, implementers of this and other algorithms can choose the particular processing steps used to transform the inputs into the outputs. Thus, by modifying the computational processes to incorporate new random information, secret information that might be sought by an attacker (such as the key or other secrets) can be concealed within or among random (or otherwise unpredictable) information incorporated into the cryptographic operations. Information leaked during the system's operation will then be correlated to the unpredictable state information (or noise), making leaked information less useful to attackers. Said another way, leaked information can be made effectively uncorrelated (or less correlated) to the device's secrets. Some particular embodiments of this general approach will be described below. One embodiment of the invention also provides for the added unpredictable information to be updated frequently to prevent attackers from using monitoring attacks to determine the state information itself.

An attacker's measurements of an operating device are often imperfect, and contain both information that is useful ("signal") and information that hinders or is irrelevant to interpretation of the signal ("noise"). (In addition, there may be irrelevant components of the measurements, such as predictable information, that neither helps nor hinders attacks.) To increase the difficulty of attack, one embodiment of the present invention increases the amount of noise in attackers' measurements and/or increases the signal complexity.

Still other embodiments of the general technique include software- and hardware- implementable clock skipping (to prevent the temporal correlation of specific operations with clock transitions provided by or observable by attackers), symmetric permutation blinding, and the introduction of entropy into the order of cryptographic operations. Such techniques are usable to prevent attackers from correlating observations with specific events within the cryptosystem's operation.

All of the foregoing will be explained in greater detail with respect to the figures and detailed description of the invention, below.

DETAILED DESCRIPTION OF THE INVENTION

The following sections describe various embodiments of a general technique of using unpredictable information to protect cryptographic systems (cryptosystems) against external monitoring attacks. Although the embodiments differ in the details of their implementations, those skilled in the art will appreciate the fundamental commonality in their essential operation—using randomness or other sources of unpredictability to decorrelate secret information from externally monitorable signals in such a way that deters external monitoring attacks (including those involving statistical accumulation and analysis of collected data) upon cryptographic systems.

Reduction of Signal-to-Noise Ratios

Unless noted otherwise, it shall be assumed herein that leakage (or the reducing, masking, or minimizing thereof) refers to the leakage (or the reducing, masking, or minimizing thereof) of any information that is potentially useful to an attacker trying determine secret information. Thus, the leaked information includes the secret information itself, but also other information pertaining to that secret information. Of course, the attacked device may also leak information, such as information correlated to its internal processing operations, that is not useful to attackers. However, such leakage of non-useful information is not relevant to this description of the present invention.

To obtain a secret key from a cryptosystem that leaks information, an attacker can gather data by observing a series of operations, perform statistical analysis on the observations, and use the results to determine the key. In a common situation, an attacker monitors a physical property, such as power consumption, of a secure token as it performs a cryptographic operation. The attacker collects a small amount of data related to the key each time the token is observed performing a cryptographic operation involving the key. The attacker increases the amount of information known about the key by collecting and statistically correlating (or combining) data from multiple observations of the token as it performs operations involving the key (or a related key).

In the case of a cryptosystem which is leaking information, such observations may contain signal (i.e., information correlated usefully to the key). However, such observations also contain noise (i.e., information and error that hinder or are irrelevant to determination of the key). The quality of the information gained from these observations is characterized by a "signal to noise" (or S/N) ratio, which is a measure of the magnitude of the signal compared to the amount of noise.

The number of operations that the attacker must analyze to recover the key depends on the measurement and analysis techniques, but is generally inversely proportional to the square of the S/N ratio. The constant of proportionality also depends upon the amount of confidence the attacker requires. For example, a relatively low confidence level may be acceptable to an attacker willing to do an optimized brute force search using statistical information about key bit values. Decreasing the signal by a factor of 15 and increasing the amount of measurement noise by a factor of 20 will reduce the signal-to-noise ratio by a factor of 300. This will generally mean that an attacker will require roughly 90,000 times as many observations to extract the same amount of information about the key. An attack requiring 1,000 observations to recover a key before the S/N reduction would now require on the order of 90 million observations to gain the same level of confidence in the recovered key.

Thus, one approach according to the general technique of using unpredictable information to protect cryptosystems against external monitoring attacks is to implement cryptographic protocols so as to produce unpredictable state information, thereby increasing the number of observations required by an attacker to compromise a key. By reducing the available signal size and/or increasing the amount of error, noise, and uncertainty in attackers' measurements, a system designer can make the so-called work function (effort required) to break a system larger.

The system can be made even more secure by making the number of samples required to gain any significant amount of useful key information exceed the maximum number of transactions that can be performed using the key, exceed the number of transactions that can be performed by the device (e.g., before the key expires), or else be so large that monitoring attacks are comparable to (or of greater difficulty than) brute force and other known attacks. For example, consider a system programmed to self-destruct after one million operations—well beyond the expected operational life of most smartcards. If a design not using the present invention requires five operations to break, and the present invention reduces the signal-to-noise ratio by a factor of 1000, the number of operations required to break the system (i.e., isolate the signal or key from the noise) might increase by a factor of roughly one million (i.e., to approximately 5 million) exceeding the lifetime of the secret or the device. Thus, attackers will be unable to collect enough measurements to compromise the secret.

Random Noise Generation

Figure 1:
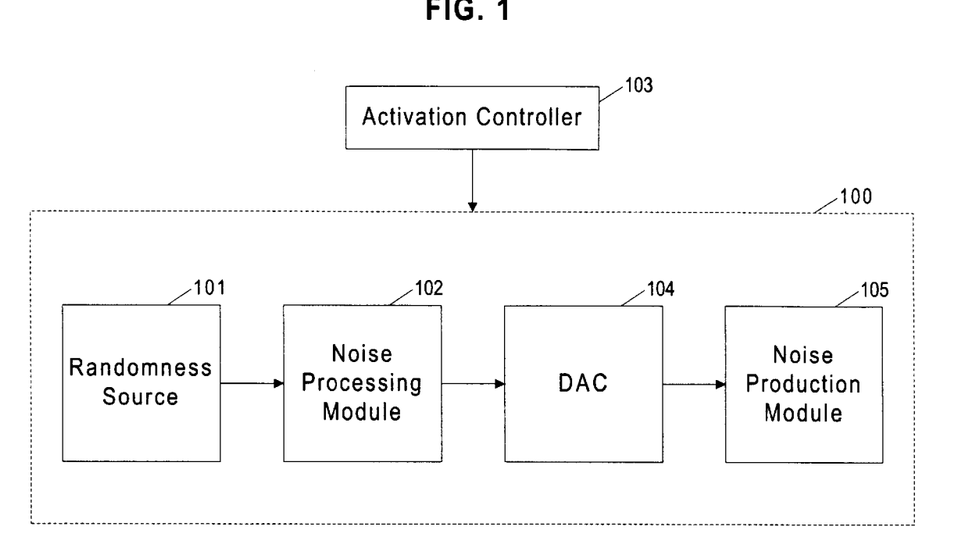
FIG. 1 illustrates an exemplary apparatus for introducing noise into a cryptosystem.

An exemplary apparatus for introducing noise into a cryptosystem is illustrated in FIG. 1. In FIG. 1, noise production system 100 includes randomness source 101, noise processing module 102 (such as, without limitation, a linear feedback shift register or a hash function-based compression function), activation controller 103, digital/analog converter 104, and noise production module (105). Other noise production systems including none, any, or all of the components of FIG. 1 can also be used within the scope of the present invention.

Randomness source 101 creates the initial noise used to generate unpredictable information. Randomness source 101 can be implemented in hardware or software. It is preferable that the random number generator be implemented in hardware because hardware implementations typically maintain less state information that can be subject to attack. If random numbers are generated via software, care should be taken to ensure that attackers cannot compromise the random number generator state and predict future random number generator outputs. For example, to help make a software random number generator resist external monitoring attacks, an implementation may incorporate extra state information and update its state frequently. Of course, as will be appreciated by those skilled in the art, truly random numbers are not always necessary or available. Therefore, as used herein, any term described as "random" will be understood to include truly random, and also pseudorandom or otherwise unpredictable, information suitable to, and depending on, the nature of the particular application at hand.

Where randomness source 101 is an analog source, its output is first converted to digital form, for example using digital/analog converter 104. The digital output produced by randomness source 101 or digital/analog converter 104 is then provided as an input to noise processing module 102. Noise processing module 102 converts the initial noise (which may be biased or have other nonrandom characteristics) into either statistically random noise or noise with desired characteristics (for example, random but with a nonlinear statistical distribution).

Many cryptosystems spend a relatively small fraction of total processing time performing security-critical operations. Therefore, the activation controller 103 can be configured so that the noise production process is activated during operations in which security is important (such as, without limitation, encryption, decryption, digital signing, data comparison, MAC verification, code verification, audit log updating, EEPROM update, and key changing), but is deactivated during non-security critical operations. A noise production activation control can thus greatly reduce many of the potential disadvantages of such a noise system (such as increased power consumption, reduced performance, increased electromagnetic radiation, decreased reliability, increased heat production, etc.). Activation controller 103 can be implemented in any of a variety of ways, including without limitation in a microprocessor cryptographic accelerator, or other well-known controller device that disables power to one or more elements of noise production system 100, forces the output of randomness source 101 (or mixer) to a particular value, forces the input or output of digital/analog converter 104 to a particular value, or disables noise production module 105.

When activation controller 103 enables noise production system 100, random output from noise processing module 102 is provided to digital/analog (D/A) converter 104. The D/A output is provided to noise production module 105, which is configured to sink power, produce electromagnetic radiation, or otherwise introduce noise into attackers' measurements, where the noise produced is a function of the D/A input. The noise production module thus introduces noise into attackers' measurements, increasing the difficulty of external monitoring attacks. Digital/analog conversion methods are known in the background art, and need not be described in detail here. For example, an array of current sources (e.g., transistors) and/or current sinks (e.g., resistors), as well as many other well known techniques can be used.

In an embodiment where randomness source 101 is an analog noise source, noise production module 105 can operate using the output of randomness source 101 as a direct input. Activation controller 103 can then operate by regulating the output of randomness source 101 or enabling and disabling noise production module 105.

To prevent noise from being observably correlated to clock transitions or other externally-measurable events, multiple noise production modules may be deployed and driven simultaneously from the same or different random sources. Alternatively, the noise processing module can be used to combine outputs from multiple noise sources and/or provide inputs to multiple noise production modules. Also, because microprocessor current usage profiles (and other externally measurable characteristics such as E/M radiation) are instruction-dependent and carry significant detail within each clock period, it may be advantageous to drive noise production modules faster than (or independently from) the clock rate applied to cryptosystem microprocessor. For example, noise production modules may include delay lines that temporally isolate their outputs from those of the others, or they may be clocked independently, or they may be free-running.

All of the foregoing components may be implemented separately or in various combinations, using analog or digital techniques as appropriate. Those skilled in the art will also appreciate that various of the components can be implemented in hardware, or even software, although hardware implementations will generally provide greater security. For example, the noise source can be integrated within the cryptosystem microprocessor itself. In single-chip environments (such as smartcards and secure microprocessors), the noise source and noise control circuitry can be integrated into the same chip that contains the microprocessor, secure memory, I/O interface, etc.

The signal-to-noise reduction techniques described herein may be implemented for use in various environments, including without limitation key management and storage systems, cryptographic accelerators (e.g., hardware DES implementations, multipliers, fast modular exponentiators, hash functions, etc.), nonvolatile memory (e.g., EEPROM, flash, etc.), data communication interfaces, buses, and (as will be evident to one of ordinary skill in the art) other computational devices and methods used in cryptographic operations.

Clock Skipping

Another approach to the general technique of using unpredictable information to protect cryptosystems against external monitoring attacks involves what will be referred to herein as clock skipping (or clock decorrelation).

During statistical attacks using power consumption or electromagnetic radiation, attackers typically compare measurements from several different operations against each other. For example, an attacker might make a sequence of observations by sampling the target device's power consumption at 200 MHz during a 5 ms portion of each of 1,000 cryptographic operations done by the target device. For this exemplary attack, 1,000 observations each containing 1,000,000 data points are thus collected. The attacker would then align these measurements so that the data points corresponding to a single point of interest can be compared and analyzed across a large number of observations.

Therefore, security can be improved by preventing attackers from locating points of interest within collected data sets and from identifying corresponding regions between observations. Indeed, causing an attacker to include incorrectly-aligned data is one way to decrease the effective signal-to-noise ratio of the attacker's data (see previous section), since the noise increases significantly (due to the inclusion of uncorrelated samples) and the useful signal decreases (due to the presence of fewer good samples).

Without accurate temporal alignment, the temporal resolution of the attacker's observations decreases greatly, making it much more difficult for the attacker to identify a signal containing fine structure. For example, a "1" bit in a secret or private cryptographic key might statistically result in a power feature consisting of a 1 $\mu A$ increase above average for 2 $\mu s$ followed immediately by a decrease to 2 $\mu A$ below average for 1 $\mu s$, while a "0" key bit might result in a power feature consisting of a 1 $\mu A$ decrease below average for 2 $\mu s$ followed by a 2 $\mu A$ increase above average for 1 $\mu s$. Differentiating such signals is easy with sub-microsecond resolution, but can be extremely difficult or impossible with only millisecond resolution unless an extraordinarily large number of samples is taken. Of course, small temporal alignment variations may not be able to conceal signal characteristics that are of large amplitude or of long duration (e.g., comparable to or larger than the size of the alignment variations). In general, then, poor temporal alignment will reduce an attacker's ability to identify fine variations within operations and significantly increase the number of measurements required for a successful attack.

Many conventional systems, including commonly available smartcards, simply use external clocks for their cryptographic operations—even though attackers can freely observe and manipulate the external clock. This greatly facilitates the ability of attackers to make the measurements necessary to attack the system. One embodiment of the present invention uses clock skipping (or clock decorrelation) to inhibit such attacks by reducing attackers' ability to predict the system state. Clock skipping involves decorrelating cryptographic operations from the normal (external) clock cycles by creating a separate, internal clock signal that is used to control processor timing during cryptographic operations. While externally-measurable characteristics (particularly power consumption and electromagnetic radiation) can reveal when some internal clock cycles occur, clock skipping will make them much more difficult for an attacker to accurately locate points of interest in measurements, particularly if noise is introduced into the signal using the techniques of the present invention. This will be described in more detail below with respect to an exemplary embodiment of the invention illustrated in FIG. 2.

Figure 2:
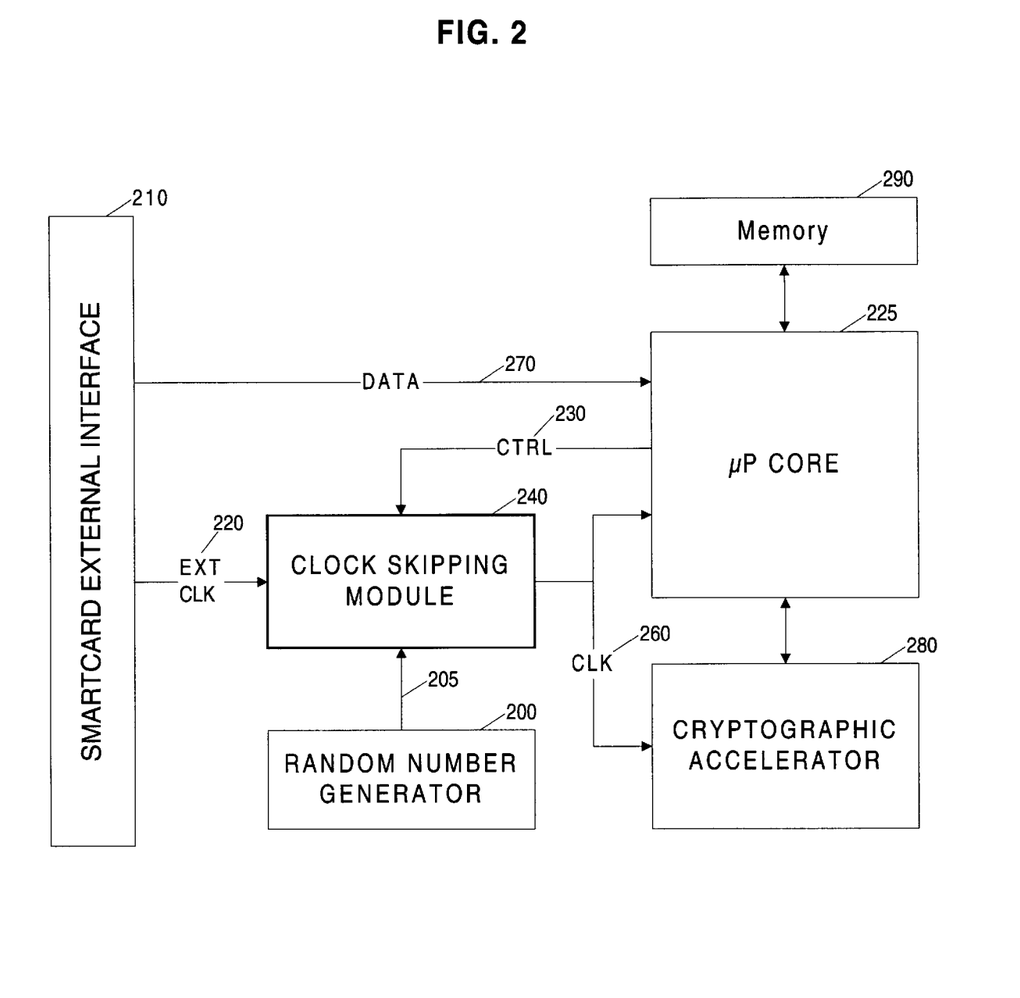
FIG. 2 illustrates an exemplary apparatus for implementing clock skipping.

Referring now to FIG. 2, random number generator 200 (which can be, but need not be, implemented in hardware) is used to determine which clock cycles (or clock state transitions) are to be used by microprocessor core 225. Random number generator 200 produces a stream of random (or pseudorandom) digital output bits or analog noise as random output 205. Clock skipping module 240 then combines (as will be described below) random output 205 with clock signal 220 received from external smartcard interface 210. Of course, clock signal 220 can also originate from another source (for example, if the invention is implemented in environments other than smartcards). In embodiments where random number generator 200 itself uses an external clock signal (e.g., where a random bit is output on each clock state transition), random number generator 200 can, but need not, use clock signal 220.

Within clock skipping module 240, random output 205 is used to select cycles of clock signal 220 to skip in order to produce clock signal 260. Alternatively, random output 205 can be used to select the closest corresponding cycles of clock signal 220 to be used as clock signal 260, or random output 205 can even be used as clock signal 260 itself. Still other approaches are possible, as will be appreciated by those skilled in the art; the basic point being that clock signal 260 be (partially or wholly) decorrelated from external clock signal 220 via random output 205.

If desired, clock skipping module 240 can optionally apply a filter to clock signal 260 to ensure desired characteristics. For example, to ensure a minimum clock rate (as opposed to a statistical average), a transition of clock signal 260 may be forced after more than a threshold number of cycles of clock signal 260 have been skipped, either recently or consecutively (e.g., a transition of clock signal 260 can be forced if clock signal 260 has not changed during more than three transitions of clock signal 220.)

Additionally, clock skipping module 240 can optionally monitor the clock rate (of either clock signal 220 or 260) to prevent attackers from stopping the clock and analyzing the device in a halted state or from operating the device too quickly. When module 240 detects such a clock fault, it can reset microprocessor core 225, clear memory 290 (which can be nonvolatile RAM, such as battery-backed CMOS, EEPROM, flash memory, a hard disk, or other such storage used to store the key and/or other information), clear the state of cryptographic accelerator 280, and log the fault in memory 290. Methods and apparatuses for detecting such clock faults are well known in the background art and need not be described in detail here.

In an alternative embodiment, clock skipping module 240 and microprocessor 225 are combined, such that random output 205 can force microprocessor 225 to skip clock cycles. For example, when microprocessor 225 is directed to skip a clock cycle (such as when three output bits equal to zero are received in random output 205), the result of the current or next instruction (or clock cycle) executed by the microprocessor is discarded and repeated.

In all of the foregoing, it should be noted that the fraction of skipped clock cycles does not need to be very large; for example and without limitation, even skipping as few as one clock cycle in 20 (on average) will introduce significant measurement drift.

One consideration introduced by clock skipping is the effect on other functions of the system besides the cryptographic operations. In particular, clock skipping may sometimes adversely affect operations requiring regular clock cycles. For example, in many smartcards, one bit is sent or received on a serial I/O (input/output) line every 372 cycles of the external clock. (Thus, a 3.579545 MHz external clock is compatible with a serial communication rate of 9600 bits per second.) However, with clock decorrelation, microprocessor 225 will operate at a different clock rate governed by signal 260. A mismatch between the data communications clock rate and the microprocessor clock rate may result, causing I/O errors to occur. Consequently, in devices implementing clock skipping, it is often advantageous for the microprocessor to be controlled by external clock 220 during I/O operations.

This can be implemented via clock skipping activation signal 230, which is used to select between external clock signal 220 and the (modified) internal clock that would otherwise be produced by clock skipping module 140. As with the noise generator activation signal of FIG. 1, clock skipping activation signal 220 can be produced by a microprocessor or any other control device that is capable of knowing when to apply (or not apply) the clock skipping. Selection of whether or not to clock skip at any particular time can be performed by many well-known techniques that need not be described in detail here. For example, in the exemplary embodiment of FIG. 2, microprocessor 225 is well suited for such a task because it is necessarily aware of I/O operations associated with the receipt of data signals 270. In general, when I/O is performed or when other non-security-critical operations are in progress, microprocessor core 225 can assert control signal 230 to cause clock skipping module 240 to ignore random output 205 and provide external clock signal 220 directly as clock signal 260. Control signal 230 and the noise production activation control signal described previously can, but need not be the same signal.

In an alternative solution to the synchronization failure problem, two separate clocks are used. A conventional external clock signal is used for I/O and other processing, where clock skipping is not needed to protect secret information. However, an internal clock signal, preferably but not necessarily generated in the device (for example, produced using a ring oscillator, which is well known in the background art), is used for internal (e.g., cryptographic) processing. Thus, internal operations need not proceed at a speed related to or derived from the external clock rate. The internal clock may be distorted or skipped, for example, as described above. Alternatively, or in addition, where an analog process is used to generate the internal clock, significant sources of randomness can also be incorporated to adjust the frequency, drift, and jitter of the clock signal to prevent accurate prediction of clock state transitions. Clock signal selection can be performed by microprocessor 225 as mentioned previously. Another technique, which is especially suitable for, but not limited to smartcards, uses a UART (universal asynchronous receiver/transmitter) or other buffer between the internally clocked region and the external I/O interface to ensure that communications over the external serial I/O interface are clocked at a rate corresponding to the externally-supplied clock but may be accessed reliably by internally-clocked circuits.

In yet another approach, the internally-generated clock signal can be derived from the external clock signal. This can be performed via an analog phase-locked loop, which is well known in the background art and need not be described in detail here. Such an internal clock will be rather closely correlated with the external clock, and therefore not as effective against attacks as the randomized clock signal or two separate clocks described previously. (Of course, its effectiveness can be improved by optionally using clock skipping or analog (or other) noise sources to adjust the frequency, drift, and jitter of its signal.) Also, when synthesizing the internal clock from the external clock, the clock-derivation circuitry can be configured to restrict the rate of the internal clock frequency, for example, to enforce a minimum internal clock frequency so that attackers cannot stop the clock and attack the device in the stopped state. The derived internal clock signal exhibits a number of useful properties that will be described in the following paragraph.

One useful property of such a slightly decorrelated internal clock is that it may be sufficiently close to the external clock that it may be used to control I/O rates reliably. In addition, because a phase-locked loop can continue to produce a valid clock signal even if the external clock changes or is removed, microprocessor 225 can continue operating so that it can detect and even respond to attacks that involve halting, removing, or altering the external clock while power is connected. The use of an internally-generated clock additionally provides protection against attacks involving the introduction of errors into computations. For example, jitter or high frequencies supplied to the external clock would cause harmless communication errors, but would be prevented from causing erroneous computations. Because a phase locked loop can produce an internal clock signal that is a multiple of the external clock signal, it is possible to clock cryptographic operations at a rate faster than the external clock, providing improved performance. In smartcards with challenging performance requirements (such as those that run interpreted codes such as Java), this is an added benefit.

All of the foregoing paragraphs describe various ways to generate a second, internal clock signal: via randomization, via a separate clock, or via derivation from the external clock. In all of these cases, the internal clock can also be used to monitor the external clock to detect abnormalities introduced by attackers. Regardless of whether the clock is produced internally or derived from the external clock, the microprocessor can have the option of selecting between multiple clock modes. For example, a slower mode might be used if it has a lower probability of computation error, a faster mode might be used when improved performance is needed, and clock skipping or other clock distortion might be activated when resistance to external monitoring attacks is desired.

Much of the foregoing has been described with respect to hardware techniques for clock decorrelation (e.g., second clocks or phase-locked loops), but clock decorrelation can also be effected by software as will be described below. This is useful, for example, where the environment does not allow for hardware-based clock skipping. Alternatively, hardware clock decorrelation could be supplemented with software-based clock decorrelation for even greater protection in security critical code segments.

One efficient software-implementable technique for clock decorrelation takes advantage of the fact that the amount of time used for a process with a conditional jump can vary depending on whether or not the jump is actually performed. In such cases, inserting branch delays can be used as a form of clock decorrelation. For example, the assembly language clock randomizer below uses a random generator to introduce clock variations that can help prevent accurate alignment by an attacker:

| Assembly Language Clock Randomizer: | |
|---|---|
| [. . .] | |
| inp reg5, RANDOM_GENERATOR | # get a random byte |
| add reg5, reg5 | # shift reg5 left once |
| brc delay1 | # branch if carry |
| nop | # extra delay if bit is 0 |
| delay1: | # continue execution |
| [. . .] | # . . .more code. . . |
| add reg5, reg5 | # shift reg5 left again |
| *brc delay_2 | # branch if carry |
| # put any code here | # obfuscating code/delay |
| delay2: | # continue execution |
| [. . .] | # . . .more code. . . |

In an alternative embodiment, instead of using random information to determine whether to take a delay branch, the random information may be used to select between parallel code processes, such that the same cryptographic result will be produced regardless of which code process is selected but where the parallel processes perform different operations toward producing the result.

This section has described temporal obfuscation techniques that are useful in preventing reliable identification and alignment of specific features in measurements of cryptographic device characteristics such as power consumption and electromagnetic radiation. However, such techniques may not always be sufficient for preventing attacks based on timing, since introduced timing delays will have a predictable statistical distribution for which attackers can compensate. Another embodiment of the general technique of implementing cryptographic protocols using unpredictable information, described below, is useful in (but is not limited to) such contexts.

Execution Path and Operation Order Entropy

Another approach to the general technique of using unpredictable information to protect cryptosystems against external monitoring attacks involves the introduction of entropy into the order of processing operations or into the execution path while maintaining desired functionality (such as compatibility with standard cryptographic algorithm definitions). More specifically, a device can use a random number generator to cause unpredictability in the order of performing a sequence of suboperations. If attackers cannot accurately determine the order in which operations were performed, cross-correlation between samples becomes more difficult or impossible. Consequently the data collected by an attacker effectively has a significantly lower signal-to-noise ratio.

As an illustrative example of operation order entropy, consider a bit permutation. Permutations are widely used in cryptography, for example in the Data Encryption Standard and other cryptographic algorithms. The following C language pseudocode illustrates a traditional method of implementing a permutation.

---

Input-Ordered Permutation (Background Art):

```
void perm2(bool dataIn[64], bool dataOut[64], int table1[64]) {
    int i;
    for (i = 0; i < 64; i++) {
        dataOut[table1[i]] = dataIn[i];
    }
}
```

---

This example is input-ordered, meaning that processing steps are performed in the order (or inverse order) in which the input bits are supplied. In the example, input bit 0 is permuted first, and input bit 63 is permuted last. Output-ordered permutations are also commonly used in the background art. Provided that table 1 is a permutation (i.e., where one element equals each of the values 0 . . . 63), the pseudocode below can be made output-ordered by changing the statement inside the loop to read: "dataOut [i]=detaIn [table 2[i]];", where table 2 is output-ordered (i.e., table2 is the inverse of table 1 above such that table1 [table2 [i]]=i).

However, both output-ordered and input-ordered permutations can leak information about the data they process. For example, in the input-ordered permutation, attackers' measurements of loop iteration i will be correlated to detain [i]. In the output-ordered permutation, the attackers' measurements of loop iteration i will be correlated to dataOut [i]. An improved permutation method would thus be advantageous. One exemplary implementation of such a method is shown in the table below. This high-entropy permutation combines several previously-described aspects of the present invention, including without limitation order randomization (thus being neither input-ordered nor output-ordered) and blinding techniques (to conceal further the data being permuted).

---

Blinded High-Entropy Permutation:

```
#define SWAP(a,b) { register int t = a; a = b; b = t; }
#define LOOPCOUNT 128
void perm3(bool dataIn[64], bool dataOut[64], int table[64]) {
    unsigned char trueRandom(void);    /* gives random byte */
    int i,p;
    int perm[64];
    bool b, temp[64];
    /* Initialize random permutation */
    for (i = 0; i < 64; i++) {
        perm[i] = i;
        temp[i] = trueRandom() & 1;
        dataOut[i] = trueRandom() & 1;
    }
    for (i = 0; i < LOOPCOUNT; i++) {
        p = trueRandom() & 63;          /* random number mod 64 */
        SWAP(perm[p], perm[i&63]);
    }
    /* Blind: temp=blinded input, dataOut=unblinding factor */
    for (i = 0; i < 64; i++) {
        p = perm[i];
        b = (bool)(trueRandom() & 1);
        temp[p] = dataIn[p] ^ b;
        dataOut[table[p]] = b;
    }
    for (i = 0; i < LOOPCOUNT; i++) {
        p = trueRandom() & 63;          /* random number mod 64 */
        SWAP(perm[p], perm[i&63]);
    }
```

---

-continued

Blinded High-Entropy Permutation:

```
    /* Perform the permutation on temp & unblind */
    for (i = 0; i < 64; i++) {
        p = perm[i];
        dataOut[table[p]] ^= temp[p];
        temp[p] = 0;
    }
}
```

---

The magnitude of signals leaked due to variations in data values (e.g., registers and memory contents) is usually smaller (often by a factor of several orders of magnitude) than signals leaked due to branches and variations in the execution path. Therefore, the high-entropy permutation operation, above, uses a constant execution path to inhibit leakage via variations in the execution path.

The exemplary blinded randomized-order permutation operation includes four steps, which can be performed separately or simultaneously: initialization, blinding, permutation, and unblinding. Implementations using partial blinding, which operate on already-blinded values, or those with reduced security requirements will not require all steps.

Initialization of the blinded randomized-order permutation operation involves constructing and randomizing a permutation table ("perm") for determining the bit order for operations. (Bit order permutation table "perm" randomizes the time at which any particular data bit is manipulated.) The bit order table is created in two passes, where the first assures that the table has the correct form (i.e., contains the numbers zero through 63), and the second introduces random order into the table. Because the process of constructing the bit order table does not involve any secret inputs, the only security requirement for the process is that the final result be unknown to attackers. As illustrated, the first permutation table initialization loop can also place random values into dataout and temp to help whiten any leaked signals when data values are first stored in these arrays. Finally, although it is not required, more than 64 iterations of the randomization loop are used to ensure that any statistical biases remaining after the randomization loop are insignificantly small.

The next section of the code performs the blinding operation. First, for each loop iteration, a random number generator produces a random blinding bit. The temporary buffer (temp) is initialized with the XOR of the random bit and an input data bit, where the input data bit is selected according to the table (perm) constructed previously. Additionally, the output buffer (dataOut) is initialized with the blinding bit, where the dataout bit is the result of using the input permutation table to operate on the index to temp. The second part of the blinding process re-randomizes the bit order permutation table (perm).

The last section performs the final bit permutation and unblinding steps. Input bits are loaded in the order specified by the table (perm), permuted according to the (non-secret) externally-specified permutation table (table), and XORed onto the destination table (dataOut).

Note that the leak-minimized permutation operation described dramatically reduces the amount of information leaked from a permutation operation, but is not necessarily expected to reduce such leakage to zero. The input data to the function arrives in fixed order and unblinded form, and the output is similarly supplied unblinded in fixed order. Consequently, two or more measurements from the same transaction might (for example) be correlated to each other such that the strength or sign of the correlation is a function of one or more input or output data bits. If inputs and/or outputs must be kept secret or if multiple permutations are to be performed on the same secret data (for example, through a multi-step operation such as encryption), operands can be maintained in a blinded state during processing, to be (partially or completely) reconstituted only when nonlinear operations must be performed or at the end of the computation.

Note that many variations on the process described are possible, as will be understood to those skilled in the art. For example and without limitation, the number of bits manipulated does not need to equal 64, the order of steps may be changed, steps can be removed for simplified implementations (such as those that are not subject to some attacks), steps can be modified, different permutation generation and update processes can be used, and additional steps can be added.

Other Considerations

Cryptographic operations should normally be checked to ensure that incorrect computations do not compromise keys or enable other attacks. Cryptographic implementations of the present invention can be, and in a preferred embodiment are, combined with error-detection and/or error-correction logic to ensure that cryptographic operations are performed correctly. For example, a simple and effective technique is to perform cryptographic operations twice, ideally using two independent hardware processors and/or software implementations, with a comparison operation performed at the end to verify that both produce identical results. If the results produced by the two units do not match, the failed comparison will prevent the defective processing result from being used. In situations where security is more important than reliability, if the compare operation ever fails (or fails too many times) the device may self-destruct (such as by deleting internal keys) or disable itself. For example, a device might erase its key storage memory if either two defective DES operations occur sequentially or five defective DES results occur during the lifetime of the device. In some cryptosystems, full redundancy is not necessary. For example, with RSA, methods are known in the background art for self-checking functions that can be incorporated into the cryptosystem implementation (e.g., RSA signatures can be verified after digital signing operations).

Detection of conditions likely to cause incorrect results may also be used. In particular, active or passive sensors to detect unusually high or low voltages, high-frequency noise on voltage or signal inputs, exposure to electromagnetic fields and radiation, and physical tampering may be employed. Inappropriate operating conditions can (for example) trigger the device to reset, delete secrets, or self-destruct.

Self-diagnostic functions such as a POST (power-on-self-test) should also be incorporated to verify that cryptographic functions have not been damaged. In cases where an ATR (answer-to-reset) must be provided before a comprehensive self-test can be completed, the self-test can be deferred until after completion of the first transaction or until a sufficient idle period is encountered. For example, a flag indicating successful POST completion can be cleared upon initialization. While the card is waiting for a command from the host system, it can attempt the POST. Any I/O received during the POST will cause an interrupt, which will cancel the POST (leaving the POST-completed flag at zero). If any cryptographic function is called, the device will check the POST flag and (if it is not set) perform the POST before doing any cryptographic operations.

Conclusions

The present invention is extremely useful for improving security, particularly in environments and applications with difficult engineering requirements, by enabling the construction of devices that are significantly more resistant to attack than devices of similar cost and complexity that do not use the present invention. Also, multiple security techniques may be required to make a system secure. For example, leak minimization and obfuscation may be used in conjunction with other security methods or countermeasures.

As those skilled in the art will appreciate, the techniques described above are not limited to particular host environments or form factors. Rather, they may be used in a wide variety of applications, including without limitation: cryptographic smartcards of all kinds including without limitation smartcards substantially compliant with ISO 7816-1, ISO 7816-2, and ISO 7816-3 ("ISO 7816-compliant smartcards"); contactless and proximity-based smartcards and cryptographic tokens; stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation programs for use on personal computers, servers, etc. and programs that can be loaded onto or embedded within cryptographic devices); key management devices; banking key management systems; secure web servers; electronic payment systems; micropayment systems and meters; prepaid telephone cards; cryptographic identification cards and other identity verification Systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; intellectual property protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems. All of the foregoing illustrates exemplary embodiments and applications of the invention, from which related variations, enhancements and modifications will be apparent without departing from the spirit and scope of the invention. Therefore, the invention should not be limited to the foregoing disclosure, but rather construed by the claims appended hereto.

What is claimed is:

1. A cryptographic processing device for securely performing a cryptographic processing operation including a sequence of instructions in a manner resistant to discovery of a secret by external monitoring, comprising:

(a) an input interface for receiving a quantity to be cryptographically processed, said quantity being representative of at least a portion of a message;

(b) a source of unpredictable information;

(c) a processor:
  (i) connected to said input interface for receiving and cryptographically processing said quantity,
  (ii) configured to use said unpredictable information to conceal a correlation between externally monitorable signals and said secret during said processing of said quantity by modifying said sequence; and (d) an output interface for outputting said cryptographically processed quantity to a recipient thereof.

2. The device of claim 1 wherein said input interface and said output interface are the same element.

3. The device of claim 1 wherein said processor is configured to use said unpredictable information in a manner such that said cryptographically processed quantity is independent of said unpredictable information.

4. The device of claim 1 wherein said cryptographic processing operation includes transforming a message with the Data Encryption Standard (DES).

5. A cryptographic processing device for securely performing a cryptographic processing operation implementing a permutation in a manner resistant to discovery of a secret by external monitoring, comprising:
  (a) an input interface for receiving a quantity to be cryptographically processed, said quantity being representative of at least a portion of a message;
  (b) a source of unpredictable information;
  (c) a processor:
    (i) connected to said input interface for receiving and cryptographically processing said quantity,
    (ii) configured to use said unpredictable information to conceal a correlation between externally monitorable signals and said secret during said processing of said quantity by randomizing the order of said permutation; and
  (d) an output interface for outputting said cryptographically processed quantity to a recipient thereof.

6. A cryptographic processing device implemented on a single microchip for securely performing a cryptographic processing operation in a manner resistant to discovery of a secret by external monitoring, comprising:
  (a) an input interface for receiving a quantity to be cryptographically processed, said quantity being representative of at least a portion of a message;
  (b) a source of unpredictable information;
  (c) a processor:
    (i) connected to said input interface for receiving and cryptographically processing said quantity,
    (ii) configured to use said unpredictable information to conceal a correlation between said microchip's power consumption and said processing of said quantity by expending additional electricity in said microchip during said processing; and
  (d) an output interface for outputting said cryptographically processed quantity to a recipient thereof.

7. The device of claim 6 including program logic to activate said expending during said processing.

8. The device of claim 7 including
  (a) program logic implementing said source of unpredictable information; and
  (b) program logic to transmit said unpredictable information to an additional power expending circuit contained in said microchip.

9. A cryptographic processing device for securely performing a cryptographic processing operation in a manner resistant to discovery of a secret by external monitoring, comprising:

(a) an input interface for receiving a quantity to be cryptographically processed, said quantity being representative of at least a portion of a message;
  (b) a source of unpredictable information;
  (c) a processor:
    (i) connected to said input interface for receiving and cryptographically processing said quantity,
    (ii) configured to use said unpredictable information to conceal a correlation between externally monitorable signals and said secret during said processing of said quantity;
  (d) an output interface for outputting said cryptographically processed quantity to a recipient thereof;
  (e) a hardware-implemented noise production subunit connected to said source of unpredictable information and configured to expend unpredictable amounts of electricity based on the output of said source of unpredictable information; and
  (f) an activation controller, which may be activated by software contained in said device, to activate and deactivate said expending of unpredictable amounts of electricity.

10. The device of claim 9 wherein said source of unpredictable information is a hardware-implemented random number generator, and wherein said noise production subunit includes a digital-to-analog converter.

11. A cryptographic processing device for securely performing a cryptographic processing operation in a manner resistant to discovery of a secret by external measurement of said device's power consumption, comprising:
  (a) an input interface for receiving a quantity to be cryptographically processed, said quantity being representative of at least a portion of a message;
  (b) an input interface for receiving a variable amount of power, said power consumption varying measurably during said performance of said operation;
  (c) a processor connected to said input interface for receiving and cryptographically processing said quantity; and
  (d) a noise production system for introducing noise into said measurement of said power consumption.

12. The device of claim 11 wherein said noise production system comprises:
  (a) a source of randomness for generating initial noise having a random characteristic;
  (b) a noise processing module for improving the random characteristic of said initial noise; and
  (c) a noise production module configured to vary said power consumption based on an output of said noise processing module.

13. The device of claim 12 wherein said noise production system is connected to said processor and is selectively operable under the control of said processor.

14. A cryptographic processing device for securely performing a cryptographic processing operation in a manner resistant to discovery of a secret by external monitoring of said device's power consumption, comprising:
  (a) an input/output interface for receiving data to be cryptographically processed, said data being representative of at least a portion of a message;
  (b) an oscillator generating a first clock signal;
  (c) an input interface for receiving a variable amount of power, said power consumption varying measurably during said performance of said operation;

(d) a source of unpredictable information;

(e) a clock decorrelator coupled to said source of unpredictable information for generating a second clock signal from said first clock signal using said unpredictable information, such that said second clock signal cannot be reliably predicted from said first clock signal; and (f) a processor:
  (i) clocked by said second clock signal,
  (ii) configured to cryptographically processing said data, and
  (iii) configured to output said cryptographically processed data using said input/output interface.

15. A cryptographic processing device for securely performing a cryptographic processing operation in a manner resistant to discovery of a secret by external monitoring of said device's power consumption, comprising:

(a) an input/output interface for receiving data to be cryptographically processed, said data being representative of at least a portion of a message;

(b) an input interface for receiving an external clock signal;

(c) an input interface for receiving a variable amount of power, said power consumption varying measurably during said performance of said operation;

(d) a source of unpredictable information;

(e) a clock decorrelator coupled to said source of unpredictable information for generating an internal clock signal from said external clock signal using said unpredictable information, such that said internal clock signal cannot be reliably predicted from said external clock signal; and (f) a processor:
  (i) clocked by said internal clock signal,
  (ii) configured to cryptographically processing said data, and
  (iii) configured to output said cryptographically processed data using said input/output interface.

16. The device of claim 15 wherein said clock decorrelator comprises a clock skipping module which selects a subset of the cycles of said external clock signal to use as said internal clock signal based on said unpredictable information.

17. The device of claim 15 wherein said source of unpredictable information comprises a hardware random number generator.

18. The device of claim 15 further comprising a monitor for detecting a clock fault in said external clock signal and preventing said processor from processing said quantity if said clock fault is detected.

19. The device of claim 15 wherein said clock decorrelator is selectively operable under the control of said processor.

20. The device of claim 15 wherein said clock decorrelator is selectively operable such that said clock decorrelator is disabled when data is being transferred across said input/output interface and enabled during said cryptographic processing operation.

21. The device of claim 15 further comprising a noise production system connected to said processor for introducing noise into said measurement of the power consumption by consuming a random amount of power during said cryptographic prosing operation.

22. A device according to claims 1, 4, 7, 9, 11, 14, 15, or 20 wherein said device comprises a smartcard.

23. A method of securely performing a cryptographic processing operation in a manner resistant to discovery of a secret within a cryptographic processing device by external monitoring, comprising:

(a) receiving a quantity to be cryptographically processed, said quantity being representative of at least a portion of a message;

(b) generating unpredictable information;

(c) cryptographically processing said quantity, including using said unpredictable information while processing said quantity to conceal a correlation between externally monitorable signals and said secret by selecting between:
  (c)(1) performing a computation and incorporating the result of said computation in said cryptographic processing, and
  (c)(2) performing a computation whose output is not incorporated in said cryptographic processing; and (d) outputting said cryptographically processed quantity to a recipient thereof.

24. The method of claim 23 where said selecting is performed in software.

25. The method of claim 23 where said selecting is performed in hardware on an integrated circuit including a microprocessor.

26. A method of securely performing a cryptographic processing operation in a manner resistant to discovery of a secret within a cryptographic processing device by external monitoring, comprising:

(a) receiving a quantity to be cryptographically processed, said quantity being representative of at least a portion of a message;

(b) generating unpredictable information;

(c) cryptographically processing said quantity, including using said unpredictable information while processing said quantity to conceal a correlation between externally monitorable signals and said secret by selecting a code process from a plurality of code processes, where said selected code process is involved in said cryptographic processing, but where the value of said outputted quantity is independent of which of said code processes was selected; and (d) outputting said cryptographically processed quantity to a recipient thereof.

27. A method of securely performing a cryptographic processing operation including a sequence of instructions in a manner resistant to discovery of a secret within a cryptographic processing device by external monitoring, comprising:

(a) receiving a quantity to be cryptographically processed, said quantity being representative of at least a portion of a message;

(b) generating unpredictable information;

(c) using said unpredictable information while processing said quantity to conceal a correlation between externally monitorable signals and said secret by using said unpredictable information to modify said sequence; and (d) outputting said cryptographically processed quantity to a recipient thereof.

28. A method of securely performing a cryptographic processing operation implementing a permutation in a manner resistant to discovery of a secret within a cryptographic processing device by external monitoring, comprising:

(a) receiving a quantity to be cryptographically processed, said quantity being representative of at least a portion of a message;

(b) generating unpredictable information;

(c) using said unpredictable information while processing said quantity to conceal a correlation between externally monitorable signals and said secret by randomizing the order of said permutation; and (d) outputting said cryptographically processed quantity to a recipient thereof.

29. A method of securely performing a cryptographic processing operation in a manner resistant to discovery of a secret within a cryptographic processing device by external monitoring of said device's power consumption, comprising:

(a) receiving a variable amount of power, said power consumption varying measurably during said performance of said operation;

(b) receiving a quantity to be cryptographically processed, said quantity being representative of at least a portion of a message;

(c) introducing noise into said measurement of said power consumption while processing said quantity; and (d) outputting said cryptographically processed quantity to a recipient thereof.

30. The method of claim 29 wherein said step of introducing noise comprises:

(a) generating initial noise having a random characteristic;

(b) improving the random characteristic of said initial noise; and (c) varying said power consumption based on said improved initial noise.

31. A method of securely performing a cryptographic processing operation in a manner resistant to discovery of a secret within a cryptographic processing device by external monitoring of said device's power consumption, comprising:

(a) receiving a variable amount of power, said power consumption varying measurably during said performance of said operation;

(b) generating a first clock signal;

(c) receiving data to be cryptographically processed, said data being representative of at least a portion of a message;

(d) generating unpredictable information;

(e) generating a second clock signal from said first clock signal using said unpredictable information, such that said second clock signal cannot be reliably predicted from said first clock signal;

(f) processing said data using said second clock signal; and (g) outputting said cryptographically processed quantity to a recipient thereof.

32. A method of securely performing a cryptographic processing operation in a manner resistant to discovery of a secret within a cryptographic processing device by external monitoring of said device's power consumption, comprising:

(a) receiving a variable amount of power, said power consumption varying measurably during said performance of said operation;

(b) receiving an external clock signal;

(c) receiving data to be cryptographically processed, said data being representative of at least a portion of a message;

(d) generating unpredictable information;

(e) generating an internal clock signal from said external clock signal using said unpredictable information, such that said external clock signal cannot be reliably predicted from said internal clock signal;

(f) processing said data using said internal clock signal; and (g) outputting said cryptographically processed quantity to a recipient thereof.

33. The method of claim 32 wherein said step of generating said internal clock signal comprises a step of selecting a subset of the cycles of said external clock signal to use as said internal clock signal based on said unpredictable information.

34. The method of claim 32 wherein said step of generating unpredictable information comprises a step of generating a random number.

35. The method of claim 32 further comprising a step of monitoring for a clock fault in said external clock signal and a step of preventing said processor from outputting said cryptographically processed quantity if said clock fault is detected.

36. The method of claim 32 further comprising a step of introducing noise into said measurement of the power consumption.

* * * * *